(12) United States Patent
Luvison et al.

(10) Patent No.: US 10,330,190 B2
(45) Date of Patent: Jun. 25, 2019

(54) GEAR LEVER

(71) Applicant: FCA Italy S.p.A., Turin (IT)

(72) Inventors: Dario Luvison, Turin (IT); Valter Maggiora, Turin (IT); Paolo Mancin, Turin (IT); Vincenzo Nuara, Turin (IT)

(73) Assignee: FCA Italy S.p.A., Turin (IT)

(*) Notice: Subject to any disclaimer, the term of this patent is extended or adjusted under 35 U.S.C. 154(b) by 284 days.

(21) Appl. No.: 15/448,983

(22) Filed: Mar. 3, 2017

(65) Prior Publication Data
US 2017/0276237 A1    Sep. 28, 2017

(30) Foreign Application Priority Data
Mar. 23, 2016    (EP) ..................................... 16161984

(51) Int. Cl.
| | | |
|---|---|---|
| *F16H 59/10* | (2006.01) | |
| *F16H 59/02* | (2006.01) | |
| *F16H 61/22* | (2006.01) | |
| *G05G 1/04* | (2006.01) | |
| *G05G 1/06* | (2006.01) | |
| *G05G 5/04* | (2006.01) | |
| *F16H 59/04* | (2006.01) | |

(52) U.S. Cl.
CPC ......... *F16H 59/0278* (2013.01); *F16H 59/10* (2013.01); *F16H 61/22* (2013.01); *G05G 1/04* (2013.01); *G05G 1/06* (2013.01); *G05G 5/04* (2013.01); *F16H 2059/0282* (2013.01); *F16H 2059/048* (2013.01)

(58) Field of Classification Search
CPC ...... F16H 59/10; F16H 59/0278; F16H 61/22; F16H 2059/0282
See application file for complete search history.

(56) References Cited

U.S. PATENT DOCUMENTS

| 4,811,921 | A | * | 3/1989 | Whitaker | ................ | B64C 13/06 |
| | | | | | | 244/234 |
| 6,029,535 | A | * | 2/2000 | Kenny | ................ | F16H 59/0278 |
| | | | | | | 403/349 |
| 7,000,497 | B1 | * | 2/2006 | Campbell | ........... | F16H 59/0278 |
| | | | | | | 74/525 |

(Continued)

FOREIGN PATENT DOCUMENTS

| DE | 102009007904 A1 | 8/2009 |
| EP |     1612455 A1 | 1/2006 |

OTHER PUBLICATIONS

European Search Report dated Sep. 6, 2016, for European Application No. 16161984.6, 3 pages.

*Primary Examiner* — David M Fenstermacher
(74) *Attorney, Agent, or Firm* — RMCK Law Group PLC

(57) ABSTRACT

A gear lever for motor vehicles is provided, of the type including a lever body, a grip, a block and a rod. The lever body defines a main axis and is configured for being associated to a gearshift device of a motor vehicle. The block is arranged to be displaced between an operative position and an inoperative position, respectively, for blocking and releasing the lever in or from a given gearshift position. The rod is slidably mounted within the lever body, and connected to which is said lever block, and which is arranged to be governed via a control member positioned on the lever body or on the grip for shifting the block from the operative position to the inoperative position. The lever is also height-adjustable.

9 Claims, 7 Drawing Sheets

(56) References Cited

U.S. PATENT DOCUMENTS

| | | | | |
|---|---|---|---|---|
| 7,677,140 B2* | 3/2010 | Hull | ............ | B25B 13/461 16/429 |
| 7,854,181 B2* | 12/2010 | Ciamillo | ............ | F16H 59/0208 74/473.29 |
| 9,010,211 B2* | 4/2015 | Corey | ............ | B60K 20/02 74/473.1 |
| 10,099,664 B2* | 10/2018 | Levich | ............ | B60T 7/104 |
| 2003/0079564 A1* | 5/2003 | Thiengtham | ............ | F16H 59/0278 74/525 |
| 2005/0229731 A1* | 10/2005 | Parks | ............ | B62M 11/06 74/122 |
| 2006/0096401 A1* | 5/2006 | Mathis | ............ | F16H 59/042 74/473.1 |
| 2009/0178505 A1* | 7/2009 | Armitage | ............ | F16H 59/0278 74/473.35 |

* cited by examiner

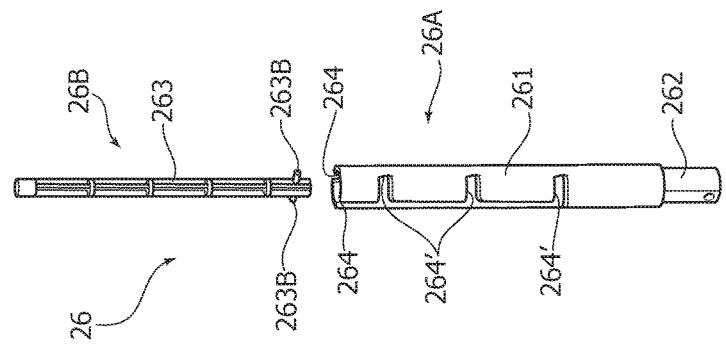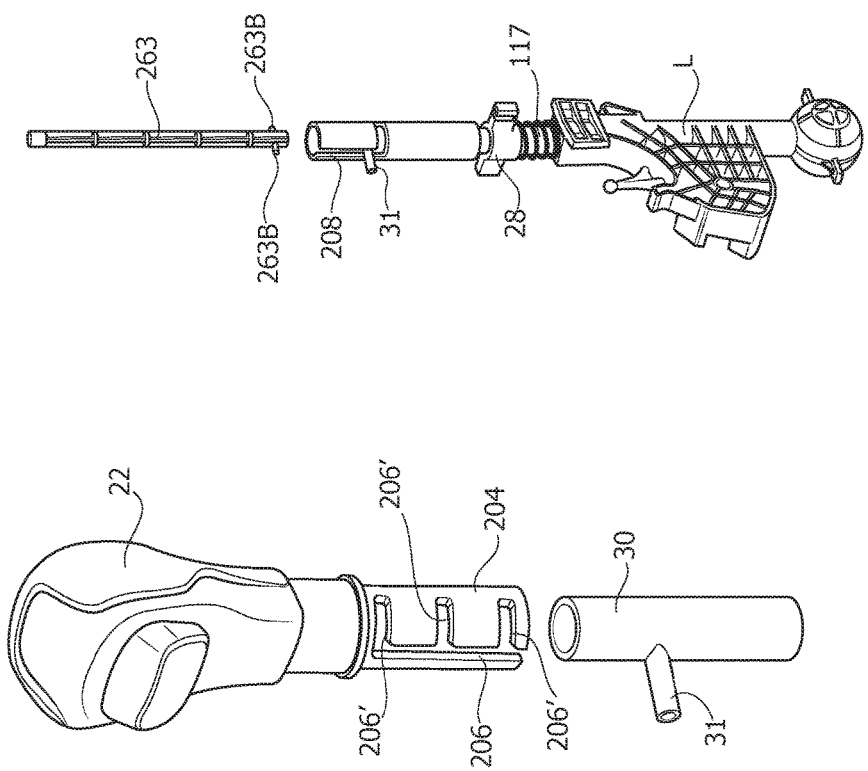

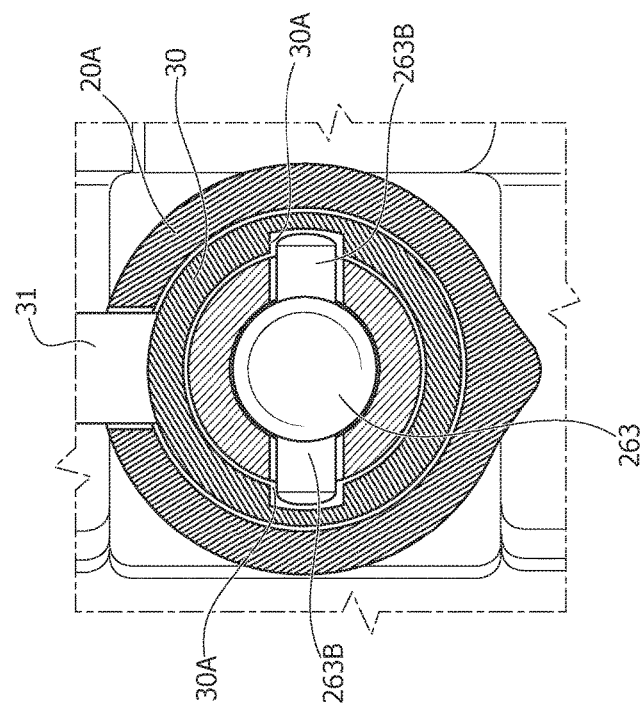
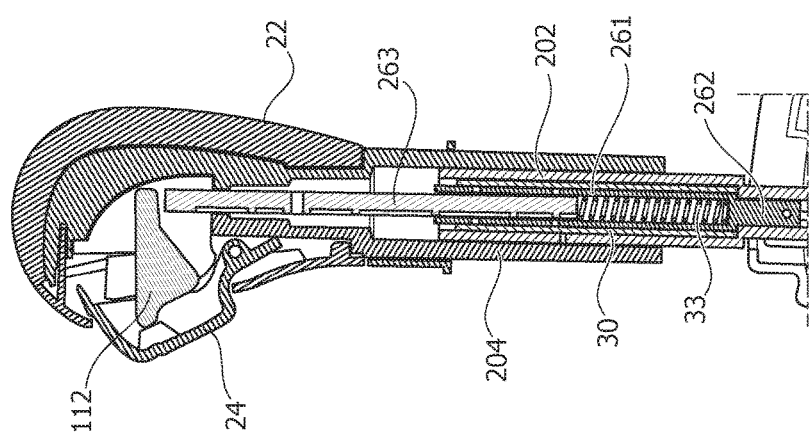

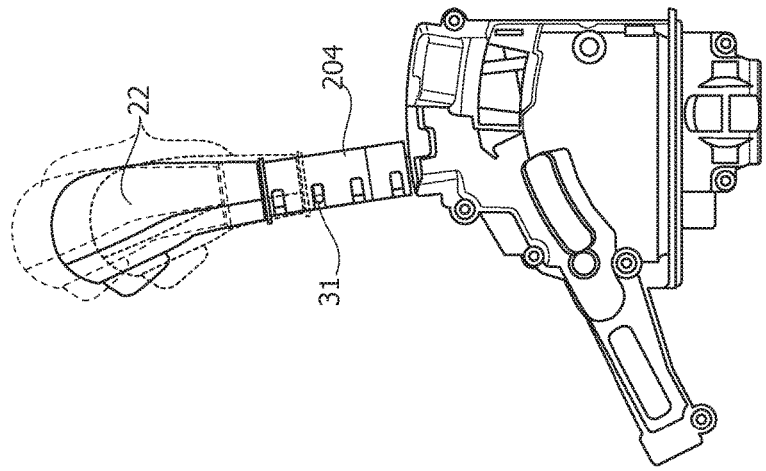
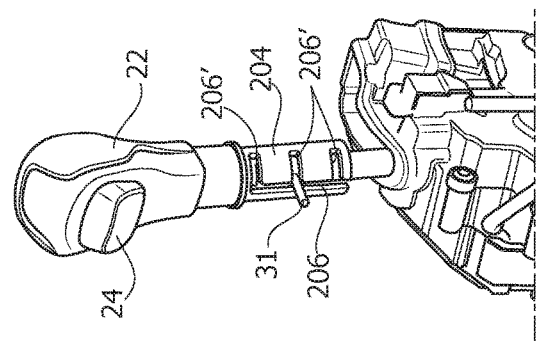
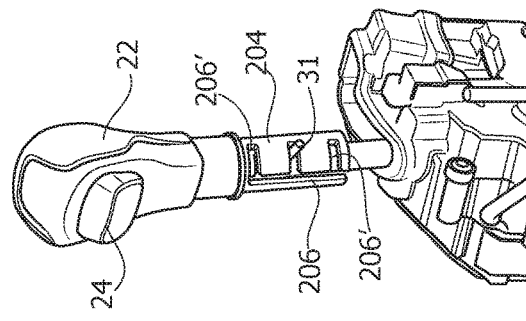

US 10,330,190 B2

GEAR LEVER

CROSS REFERENCE TO RELATED APPLICATIONS

This application claims priority to European Patent Application No. 16161984.6 filed on Mar. 23, 2016, the entire disclosure of which is incorporated herein by reference.

FIELD OF THE INVENTION

The present invention relates to a gear lever for motor vehicles.

In particular, the present invention regards a gear lever of the type comprising:

a lever body configured for being associated to the gearshift device of a motor vehicle;

a grip;

a block, which can be displaced between an operative position and an inoperative position, respectively for blocking and releasing the lever in or from a given gearshift position; and a rod, which is slidably mounted within the lever body, to which said lever block is connected, and which can be governed via a control member positioned on the lever body or on the grip, for shifting said block from said operative position to said inoperative position.

OBJECT OF THE INVENTION

The object of the present invention is to provide a gear lever of the type referred to above, which is adjustable in height in order to be able to adapt to the most ergonomic position for the driver.

A further object of the present invention is to obtain that the adjustment mentioned above envisages an operating mode that is intuitive, simple, and of rapid, at the same time preventing any accidental adjustment.

Yet a further object consists in providing the lever in question with a relatively simple structure that can be associated to already existing gearshift devices, without any need for particular modifications and/or interventions on the aforesaid devices.

One or more of the objects indicated above are achieved via an automotive gear lever comprising the characteristics of claim 1.

BRIEF DESCRIPTION OF THE DRAWINGS AND OF SOME EMBODIMENTS OF THE INVENTION

Further characteristics and advantages of the invention will emerge from the ensuing description with reference to the annexed drawings, which are provided purely by way of non-limiting example and in which.

Figure 1A:
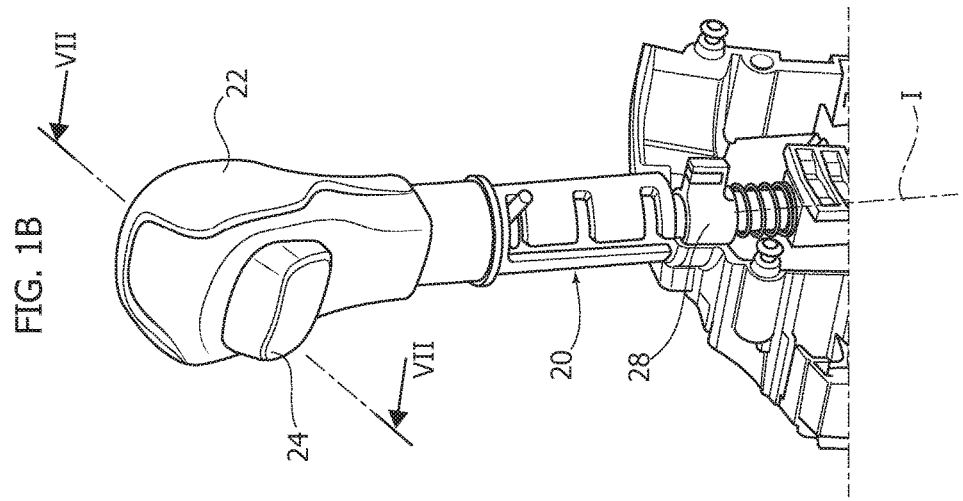
FIG. 1A is a schematic illustration of a gear lever of the known type described at the start.
Figure 1B:
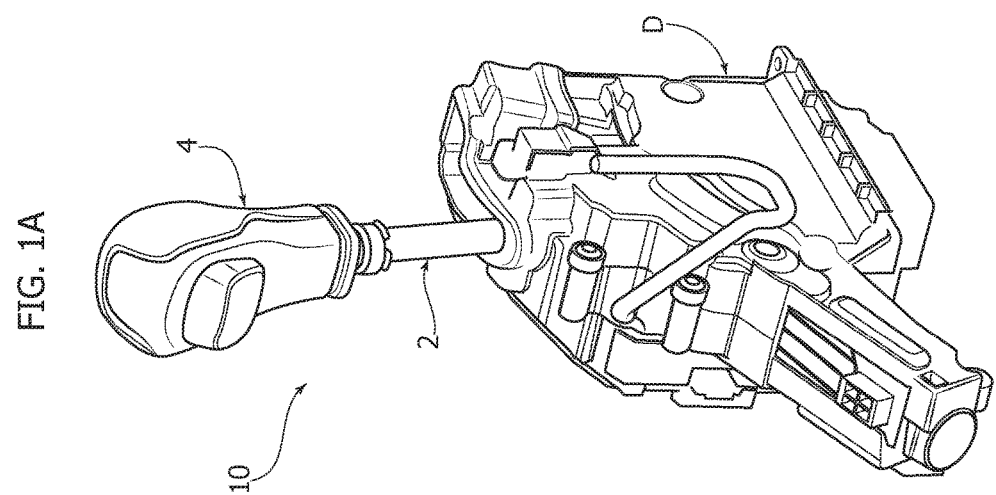
FIG. 1B is a schematic illustration of an embodiment of the lever according to the invention.
Figure 3:
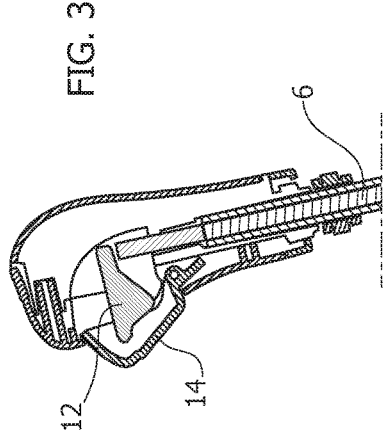
FIG. 3 illustrates the enlargement of a detail of FIG. 2.
Figure 10:
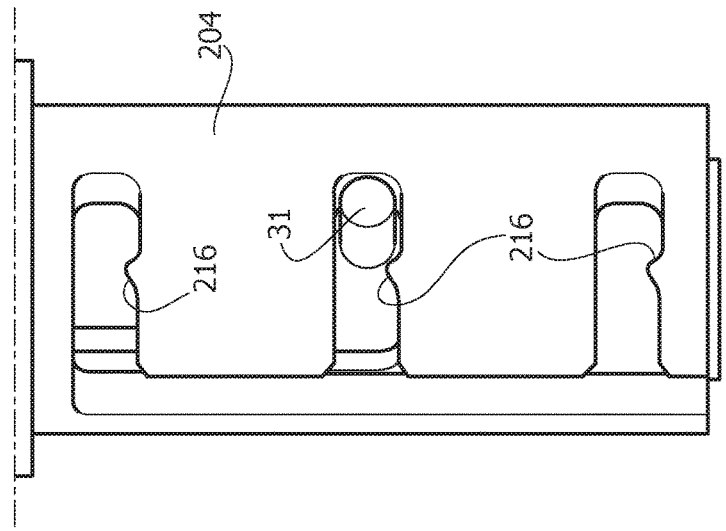
Figure 9B:
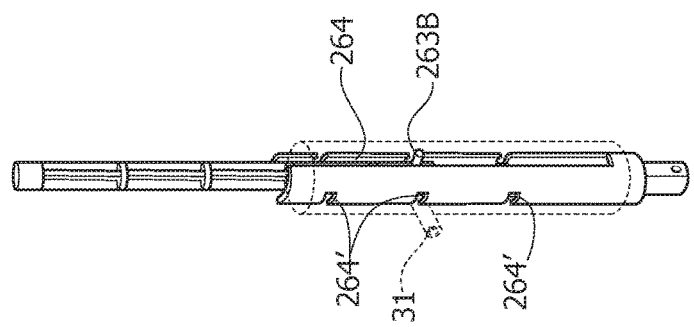
Figure 9A:
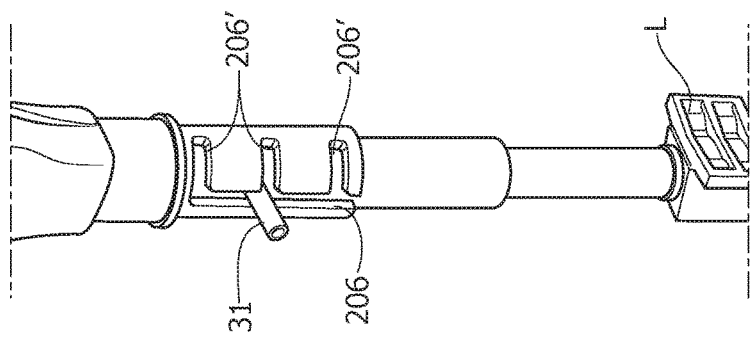

FIGS. 6A, 6B, and 6C illustrate, according to axonometric views, various components of the lever of FIG. 1B;

FIG. 7 is a cross-sectional view of the lever of FIG. 1B according to the plane of section VII-VII indicated in FIG. 1B;

FIG. 8 is a cross-sectional view of the lever described herein according to a plane orthogonal to the plane VII-VII of FIG. 1B;

FIG. 9A illustrates the configuration assumed by various external components of the lever of FIG. 1B during the procedure of adjustment of the height of the lever in the operative position;

FIG. 9B illustrates an internal detail of the configuration assumed by various components of the lever of FIG. 1B during the same procedure of adjustment of the height of the lever;

FIG. 10 illustrates a detail of the lever of FIG. 1B in one of the inoperative positions; and FIGS. 11A, 11B, and 11C illustrate three different steps of the procedure of adjustment of the height of the lever.

DETAILED DESCRIPTION OF THE INVENTION AND OF AT LEAST ONE PREFERRED EMBODIMENT THEREOF

In the ensuing description, various specific details are illustrated aimed at enabling an in-depth understanding of the embodiments. The embodiments may be provided without one or more of the specific details, or with other methods, components, or materials, etc. In other cases, known structures, materials, or operations are not shown or described in detail so that various aspects of the embodiment will not be obscured.

The references used herein are only provided for convenience and hence do not define the sphere of protection or the scope of the embodiments.

As mentioned at the start, the present invention regards a gear lever or selector for motor vehicles. The lever described herein has been devised, in particular, for automatic gear changes. However, the same lever can be used also in applications on manual gear changes with possible simplifications.

FIGS. 1A and 2-4B illustrate an example of a lever of a known type, designated as a whole in the drawings by the reference number 10. The lever 10 is represented mounted on a gearshift device D.

Figure 4A:
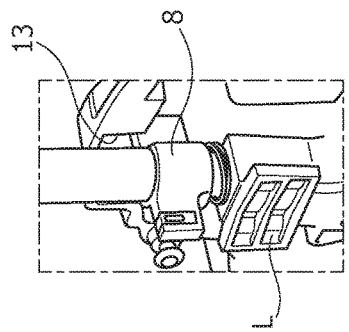
FIGS. 4A and 4B show a detail of the lever of FIG. 1A, when this is in two respective different operating conditions.
Figure 4B:
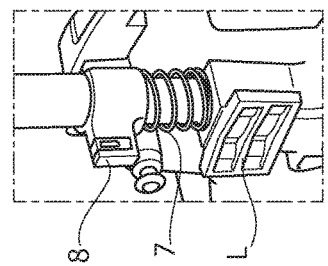
Figure 2:
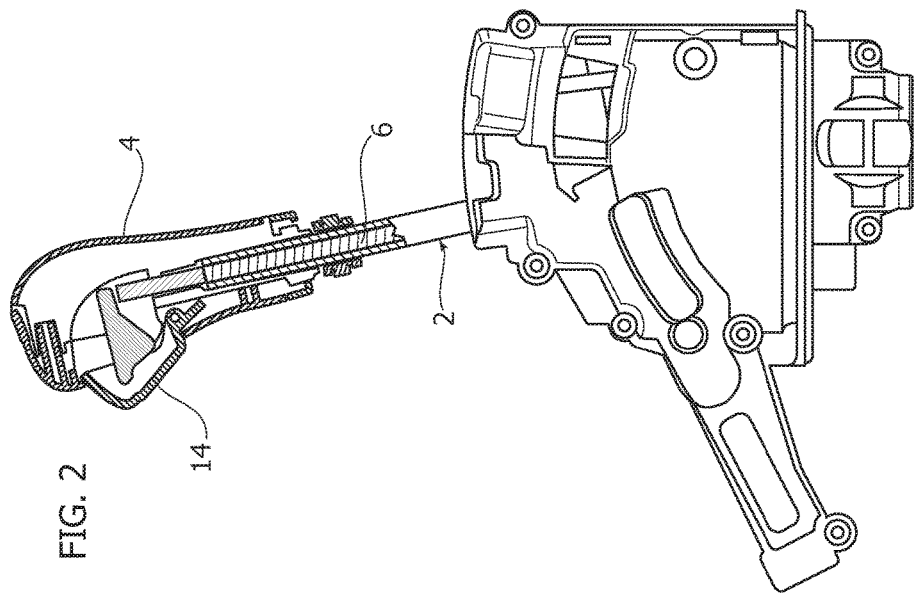
FIG. 2 is a cross-sectional view of the lever of FIG. 1A.

With reference to FIGS. 2-4B, the lever 10 comprises a lever body 2, which is received within a corresponding seat obtained in an actuator member L of the device D (FIGS. 4A and 4B). Fixed on the top end of the lever body 2 is a grip 4 for the driver. The lever 10 further comprises a rod 6 slidably mounted within the lever body 2 and rigidly connected, at the bottom, to a block 8, which is in turn slidably mounted on the outer surface of the lever body 2. At the top, the rod 6 is associated, via interposition of a cam member 12, to a pushbutton 14, which is carried by the grip 4 and via which the driver can govern movement downwards of the rod 6 and of the block 8 connected thereto. The travel of return of the rod 6 and of the block 8 is controlled by a spring 7, which directly engages the block 8 pushing it upwards.

As may be seen in FIGS. 4A and 4B, in the condition of installation, the block 8 is located within the casing of the control device D. It has the function of blocking the lever in a given position. In conventional applications, this position corresponds to the position P of selection of the "parking" condition of the gear change.

In particular, the block 8 is designed to co-operate with a slot 13 provided within the casing of the device D, into which it is pushed by the spring 7 when the lever is brought into the aforesaid given position, thus preventing any movement of the lever from this position.

In order to release the lever from the above position, the driver simply has to press the pushbutton 14, which determines movement downwards of the rod 6 and of the block 8, the latter thus going into a position of disengagement from the slot 13.

As anticipated above, the object of the present invention is to provide a lever of the type just described, which is adjustable in height in order to enable any driver to select the position of the grip of the lever that is the most comfortable for him.

With reference to the solution illustrated above, it may now be noted that a hypothetical variation of the position of the grip, however, comes up against a series of problems deriving from the fact that the lever in question carries with it the various members and elements designed to determine the lever block discussed above.

In particular, as has been seen, the lever carries on it the pushbutton 14, the cam 12 for transmission of the motion of the pushbutton, the rod 6 designed to transmit this motion to the block 8, as well as the block 8 itself. Shifting of the grip upwards or downwards, in order to adjust the position in height thereof, would clearly involve the entire kinematic chain constituted by the above elements, and this would cause, in the known solution examined, either deformation or failure of this chain, with the result of jeopardizing operation of the lever-block function.

It is clear, instead, that this functionality must be guaranteed for any position of the grip that may be chosen by the driver.

The problems referred to above have been, instead, solved by the present applicant with the lever forming the subject of the present invention. FIG. 1B illustrates a preferred embodiment of this lever.

In general, the lever described herein comprises (see FIGS. 1B and 5-11C):
- a lever body 20, which defines a main axis I, and is configured for being associated to the control device D of a gear change;
- a grip 22;
- a lever block 28, which can be displaced between an operative position and an inoperative position, respectively for blocking and releasing the lever in or from a given gearshift position;
- a rod 26, slidably mounted within the body 20, to which said lever block 28 is connected and which can be governed by the driver via a control member 24 positioned on the grip 22, for shifting said lever block 28 from the operative position to the inoperative position.

In order to provide the possibility mentioned above of regulating the vertical position of the grip 22, the lever described herein presents the following characteristics (see in particular FIG. 5 and FIG. 6C):
- the lever body 20 is formed by a first body 20A and a second body 20B, the mutual position of which along the axis I can be selected by the driver—in the way that will be illustrated in what follows—on the basis of the desired vertical position of the grip 22;
- the rod 26 is, in turn, formed by a first element 26A and a second element 26B, the mutual position of which along the axis I is determined by the position selected for the two bodies 20A and 20B; and
- the lever comprises a blocking member 30, which is operatively associated to at least one of the bodies 20A and 20B and to at least one of the elements 26A and 26B, and which can be governed by the driver between a first position in which the bodies 20A and 20B, on one side, and the elements 26A and 26B, one the other, are mutually constrained along the axis I, and a second position in which, respectively, these bodies and elements are free to move with respect to one another along the axis I.

As will be seen in what follows, in various embodiments the lever presents the following characteristics:
- the body 20B has, along the axis I, a series of blocking portions—in the embodiment illustrated the slots 206' (FIG. 9A)—configured for defining a corresponding series of pre-set mutual positions, of the two bodies 20A and 20B, which can be selected as a result of a movement of relative sliding between the two bodies along the axis I;
- the element 26A has, along the axis I, a series of blocking portions—in the embodiment illustrated the slots 264'—that have an arrangement corresponding to that of the series of blocking portions provided on the body 20B; and
- the blocking member 30 (FIG. 8) is carried by the lever body 20 so as to be rotatable with respect thereto, and is configured for sending, as a result of its rotation from a first angular position to a second angular position, a first block 31 into engagement with a blocking portion of the aforesaid body 20B, and a second block 263B into engagement with a corresponding blocking portion of the element 26A.

It is pointed out that the solution described herein is, hence, characterized in that both the lever body and the rod for control of the lever block may be broken down into two distinct bodies that are mobile with respect to one another along the axis of the lever, in such a way that the relative positions of the two bodies that form the rod for control of the lever block will be adjusted automatically on the basis of the mutual position assumed by the two lever bodies 20A and 20B. This configuration enables the rod to adapt its own length to that of the lever body selected by the driver, this guaranteeing proper operation of the blocking system whatever the adjustment position.

The lever described herein is moreover characterized in that the member 30 is by itself able to render mobile or to constrain with respect to one another the lever bodies 20A and 20B and the elements 26A and 26B of the rod, so that the driver simply has to act on the latter to carry out adjustment of the lever. Adjustment of the lever is hence intuitive, simple, fast and never accidental thanks to the profile of the grooves 216 of FIG. 10.

A preferred embodiment of the lever according to the invention will be described in detail hereinafter.

Figure 5:
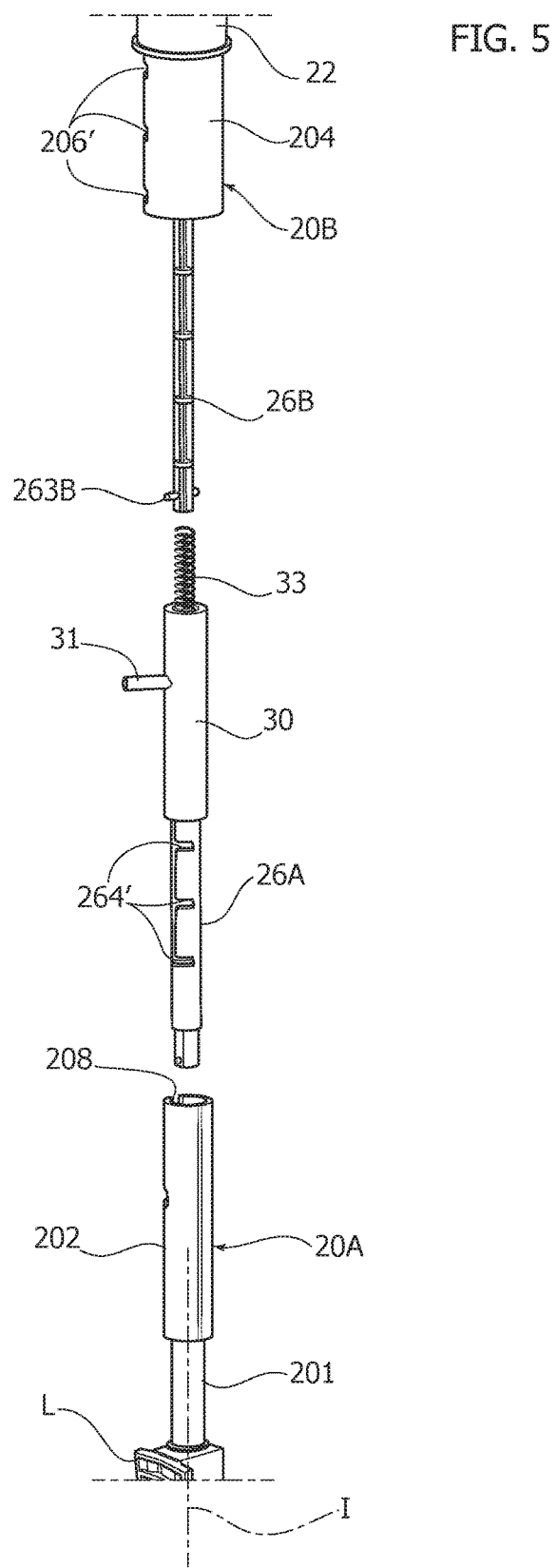
FIG. 5 is an exploded axonometric view of the lever of FIG. 1B.

With reference to FIG. 5 and to FIGS. 6A-6C, the body 20A of the lever body 20 has a general cylindrical conformation and defines, in particular, two tubular portions 201 and 202 with different diameter. The portion 201 with smaller diameter is configured so that it can fit into a corresponding seat provided in the actuator L of the control device D.

The body 20B of the lever body 20 also has a tubular portion 204 fixed on the top end of which is the grip 22 of the lever. The portion 204 is configured for being able to receive inside it the portion 202 of the body 20A, according to a coupling that enables mutual sliding of the two portions along the axis I. This sliding movement makes it possible to vary the mutual position of the two bodies in order to adjust the vertical position of the grip 22. As in the lever of a known type, the grip 22 carries a pushbutton 24 for control of the lever block 28.

The blocking member 30 likewise has a tubular configuration and is provided with a radial pin 31. This member is contained within the portion 202 and is rotatable with respect thereto. Its pin 31 comes out of the aforesaid portion through a slot 208 provided in the portion 202. It should be noted that the slot 208 (see FIG. 6B) has a circular stretch for enabling, precisely, rotation of the member 30—for a limited angular stretch, as will be explained in what follows—and a longitudinal stretch, which simply has the purpose of enabling insertion of the member 30, together with its pin 31, into the portion 202. In this connection, it may be noted that the pin 31 may also be a separate body and be applied to the body 30 after the latter has been inserted inside the portion 202. In this case, the longitudinal stretch of the slot 208 might even not be provided.

With particular reference to FIG. 6A, the portion 204 has a slot 206, which extends substantially in its longitudinal direction and deriving from which are a series of transverse slots 206', arranged at different heights along the portion 204. As will be seen hereinafter, the slots 206' define the various positions that the body 20B—and consequently the grip 22—can assume with respect to the body 20A.

The pin 31 can engage, alternatively, either the slot 206 or else any one of the slots 206', shifting from one position to the other via rotation of the member 30. When the pin 31 engages the longitudinal slot 206, the body 20B can be displaced along the axis I, since this slot constitutes a guide for the pin 31 during the aforesaid movement. When, instead, the pin 31 engages any one of the transverse slots 206', this movement is prevented by the interaction of the pin with the opposed edges that define each of the slots 206'.

In the light of what has been said above, the vertical position of the grip 22 can hence be varied by simply carrying out the following operations:
  rotating the member 30 so as to bring the pin 31 into the longitudinal slot 206;
  shifting the body 20B along the axis I into the desired position, aligning the pin 31 with one of the slots 206'; and
  rotating the member 30 once again, in a direction opposite to the previous one, so as to bring the pin 31 into the corresponding slot 206'.

In various preferred embodiments, as in the one illustrated (see in particular FIG. 10), in their final stretch the transverse slots 206' have, on one of their opposed edges, a relief or bump 216 designed to prevent the pin 31 from accidentally coming out of the corresponding slot.

The positions of adjustment (in a number that varies from a minimum of two) of the grip 22 clearly depend upon the number and mutual distance of the slots 206', so that these parameters must be determined case by case, according to the specific needs of the various applications.

With reference, now, to the means for control of the block 28, the elements 26A and 26B that make up the rod 26 are both contained within the two bodies 20A and 20B.

The element 26A (see FIG. 6C) has a tubular portion 261 that is to be housed within the portion 202 of the body 20A, remaining also within the member 30, which, as has been seen above, is also housed within said portion. The element 26A moreover has an appendage 262, which fits, instead, into the portion 201 of the body 20A (see FIG. 7).

The other element 26B of the rod 26 is constituted by a bar 263, which fits into the tubular portion 261. The bar 263 has a cross section of dimensions smaller than the internal seat defined by the portion 261 so that it can both slide and turn with respect to this portion in order to perform the functions that will be described in what follows. Set between the bottom end of the bar 263 and the bottom of the portion 261 is a spring 33.

The portion 261 has a pair of longitudinal slots 264, departing from each of which is a respective series of transverse slots 264', according to a configuration that reproduces in a substantially corresponding way the configuration defined by the set of slots 206 and 206' of the portion 204. The bottom end of the bar 263 has, in turn, two opposed transverse pins 263B, which are each designed to engage one of the two slots 264 and the corresponding transverse slots 264'. It should be noted that the portion 261 may even present just one slot 264 with the respective transverse slots 264', and likewise the bar 263 may be provided with just one pin 263B.

In a way similar to what has been described above with reference to the member 30 and to the portion 204, the bar 263 can be rotated with respect to the portion 261 so as to bring its pins 263B into engagement, alternatively, either with the longitudinal slots 264 or else with a pair of transverse slots 264'. In the first condition, the bar 263 is free to translate with respect to the portion 261, and its position with respect to this portion can hence be modified. In the other condition, it is, instead, prevented from moving and is in effect constrained to the portion 261 with respect to any movement along the axis I.

In the latter condition, the elements 26A and 26B together constitute a single rigid body and are hence able to move the block 28 following upon operation of the pushbutton 24 provided on the grip 22. In this connection, it is pointed out that the block 28 is connected to the portion 262 of the element 26A via a transverse pin (not visible), which fits into mutually aligned holes, respectively, of the block 28 and of the portion 262. On the other hand, the bar 263 and the element 26B connected thereto can be actuated in their movement along the axis I by any member that is able to convert the movement of rotation of the pushbutton into the movement referred to above of translation along the axis I. In the example illustrated, a cam member 112 of the same type as the one provided in the known solution of FIGS. 1A-3 is used for this purpose. In general, it is in any case possible to use any other means of a known type suited for the purpose.

As in the lever of FIG. 1A, the travel of return of the elements 26A and 26B and of the block 28 is controlled by a spring 117, which directly engages the block 28, pushing it upwards.

The possibility of varying the mutual position of the two elements 26A and 26B arises from the need to be able to change the overall length of the rod 26 according to the displacement that involves the body 20B during adjustment of its position carried out by the driver. It is clear, in fact, that to a variation of the position of the body 20B there must necessarily correspond a variation, of a corresponding amount, of the overall length of the rod 26, in such a way as to be able to guarantee, also in the new position of the body 20B, proper operation of the lever-block control system.

In the lever described herein, adaptation of the length of the rod to the new position of the body 20B is in fact automatic, thanks to the presence of the spring 33 between the bar 263 and the portion 261 that receives it. This, in fact, by pressing on the bar 263, on the one hand enables compensation of any variation of position imposed on the bar 263 and on the portion 261 by the displacement of the body 20B, and, on the other hand, makes it possible to keep the bar always in contact with the actuation members present within the grip (the cam member 112 in the embodiment illustrated).

Hence, given what has been said above, when the body 20B is raised or lowered during its adjustment, the bar 263 is displaced with respect to the element 26A by an exactly corresponding stretch.

Now, the condition in which the bar 263 is free to move with respect to the portion 261 must be synchronized with the condition of release of the two bodies 20A and 20B described above, precisely for the fact that, as has been said, this possibility of movement is dictated by the need to adapt the length of the entire rod 26 to the new position assumed by the body 20B during the adjustment step.

Once again as has been seen above, what determines the released condition and the condition of blocking of the bar is the orientation thereof, and, in particular, the position assumed by its pins 263B. When the pins 263B are aligned with the longitudinal slots 264, the bar 263 can slide with respect to the tubular portion 261, whereas, when these engage a pair of transverse slots 264' the bar is constrained to the portion 261. Likewise, the released condition and the condition of mutual blocking of the two bodies 20A and 20B is determined—as has been seen—by the orientation of the member 30 and of its pin 31. When the pin 31 engages the longitudinal slot 206, the body 20B can be displaced along the axis I, whereas when the pin 31 engages any one of the transverse slots 206', this movement is prevented.

Hence, in order to synchronize the two released conditions indicated above, respectively of the bar 263 and of the body 20B, the blocking member 30 and the bar 263 are mutually connected in rotation. This connection is such that, when the pin 31 occupies one of the slots 204', the pins 263B are located within respective slots 264' of the portion 261. Starting then from this condition, when the pin 31 is disengaged from the respective slot 206' (see FIG. 9A), at the same time the pins 263B exit from the respective slots 264' and move into a position corresponding to the longitudinal slots 264 (see FIG. 9B). Likewise, when the pin 31 is brought into engagement with a new transverse slot 206', at the same time the pins 263B are brought into engagement with two corresponding slots 264'.

Incidentally, in the light of the operation outlined above, the reason why the slots 264 and 264' and the slots 206 and 206' reproduce substantially the same configuration is evident.

In various preferred embodiments, as in the one illustrated (see in particular FIG. 8), the connection referred to above between the member 30 and the bar 263 occurs by means of the same pins 263B of the bar, which come to engage two opposed longitudinal grooves 30A, provided on the inner side of the member 30. It should be noted that the pins 263B can slide within these grooves, this in order to enable free movement of the bar 263 together with the element 26A, during activation or de-activation of the lever block 28.

In brief, operation of the lever disclosed herein is described in what follows.

With reference to FIGS. 11A-11C, in an initial step A illustrated in/as FIG. 11A, the grip is positioned in one of the pre-set vertical positions of the lever, and, in this condition, the bodies 20A and 20B are blocked with respect to one another by means of the pin 31 that engages with one of the slots 206', and the elements 26A and 26B are in turn rigidly connected by means of the pins 263B that engage with corresponding slots 264'. Operation of the pushbutton 24 determines actuation of the cam 112, of the rod 26, and consequently movement of the lever block 28.

To change the position of the grip, it is sufficient to turn the blocking member 30 via the pin 31 so as to bring the pin 31 itself to disengage from the transverse slot 206' in which it is located, aligning it with the longitudinal slot 206 (see step B illustrated in/as FIG. 11B). In this condition, the body 20B can be lowered or raised with respect to the body 20A. At the same time, rotation of the member 30 orients the bar 263 so as to disengage the pins 263B from the corresponding pair of slots 264' and align them with the longitudinal slots 264. In this condition, the bar 263 is released from the element 26B with respect to a movement along the axis I, and follows the displacement of the body 20B as a result of the action exerted by the spring 33.

After the grip 22 has been brought into the new desired position (see step C illustrated in/as FIG. 11C), via a direct action on the pin 31 that causes rotation of the member 30 in the direction opposite to the previous rotation, the pin 31 is brought to engage the corresponding slot 206', and, at the same time, the pins 263B are brought to engage corresponding seats 264'. The body 20B is thus blocked in the new position, and the two elements 26A and 26B come again to constitute, together, a single rigid rod for actuation of the block 28.

From the above description, it clearly emerges that the lever described herein is able to offer an adjustment of the vertical position of the grip of the lever, at the same time preserving the functionality and reliability of traditional levers.

The adjustment provided envisages an operating mode that is absolutely intuitive, safe, and easy to use for the driver. Moreover, as has been seen, the lever described herein maintains as a whole a simple and compact structure, and, above all, can be directly associated to already existing gearshift devices, without any need for particular adaptations.

It should now be noted that the lever described herein may clearly present also embodiments that differ from the preferred one described above. For example, with reference to the lever body, this may envisage a configuration reversed with respect to the one illustrated in the figures, in which it is the body 20A that receives the body 20B inside it. Likewise, with reference to the rod 26, this may envisage that the element 26B has a tubular shape and, instead, the element 26A has the shape of a bar and is received inside the other element. Once again, the control member of the lever block, instead of being constituted by the pushbutton 24 carried by the grip 22, may be constituted by a mobile collar, associated to the lever body in a position underlying the grip 22.

Another embodiment, not described herein, may be constituted by an assembly for blocking the various bodies 26A and 26B with respect to one another to enable a step-by-step adjustment that is even finer than the one proposed herein.

The same adjustment principle can be readily extended also to other contexts, such as the hand-brake lever or control levers in general.

Of course, without prejudice to the principle of the invention, the details of construction and the embodiments may vary, even significantly, with respect to what is illustrated herein purely by way of non-limiting example, without thereby departing from the scope of the invention, as defined by the annexed claims.

What is claimed is:

1. A gear lever for motor vehicles, comprising:
   a lever body, which defines a main axis and is configured for being associated to a gearshift device of a motor vehicle;

a grip;

a lever block, which is configured to be displaced between an operative position and an inoperative position, respectively, for blocking and releasing the lever in or from a given gearshift position; and a rod, slidably mounted within the lever body, to which said lever block is connected, and which is configured to be governed via a control member positioned on the lever body or on the grip, for shifting said block from said operative position to said inoperative position, wherein:

said lever body is formed by a first body and a second body, a mutual position of which along said axis is configured to be selected by a driver on the basis of the desired vertical position of the grip;

said rod is, in turn, formed by a first element and a second element, a mutual position of which along said axis is determined by the position selected for said first and second bodies;

said lever comprises a blocking member, which is operatively associated to at least one of said first and second bodies and to at least one of said first and second elements, and which is configured to be governed by the driver between a first position in which said bodies, on one side, and said elements, on the other, are mutually constrained along the axis, and a second position in which said bodies and elements, respectively, are free to move with respect to one another, along said axis.

2. The lever according to claim 1, wherein:
said first body or said second body has, along said axis, a series of body blocking portions configured for defining a corresponding series of pre-set mutual positions of said bodies, which are configured to be selected as a result of a movement of relative sliding between said bodies along the axis;

said first element or said second element has, along said axis, a series of element blocking portions that have an arrangement corresponding to that of the series of body blocking portions provided on said first body or said second body;

said blocking member is carried by said lever body so as to be rotatable with respect thereto, and is configured for bringing, as a result of its rotation from a first angular position to a second angular position, a first block into engagement with a body blocking portion of the series of body blocking portions of said first body or said second body, and a second block into engagement with a corresponding element blocking portion of the series of element blocking portions of said first element or said second element.

3. The lever according to claim 1, wherein set between said first and second elements is a spring exerting thereon an action pushing said first element towards said first body and said second element towards said second body.

4. The lever according to claim 1, wherein:
said second block is carried by said first element or said second element; and
said blocking member is connected in rotation to said first element or said second element that carries said second block.

5. The lever according to claim 1, wherein:
said first block is carried by said blocking member.

6. The lever according to claim 5, wherein:
provided on said first body or said second body is a slot, which extends substantially along said axis and deriving from which are a series of transverse slots, arranged at different heights along said axis;
wherein in said first position of said blocking member, said first block engages said longitudinal slot, whereas in said second position of said blocking member, said first block is designed to engage one of said transverse slots.

7. The lever according to claim 6, wherein:
provided on said first element or said second element are at least one longitudinal slot, which extends substantially along said axis, and a series of transverse slots, according to an arrangement similar to that of said series of transverse slots of said first body or said second body;
wherein, in said first position of said blocking member, said second block engages said longitudinal slot, whereas, in said second position of said member, said second block is designed to engage one of said transverse slots.

8. The lever according to claim 1, wherein:
said first and second elements are mounted on one another according to a telescopic configuration.

9. The lever according to claim 1, wherein:
said first and second bodies are mounted on one another according to a telescopic configuration.

* * * * *